Jan. 3, 1967    F. L. MIDDLETON    3,295,903
ASH TRAY

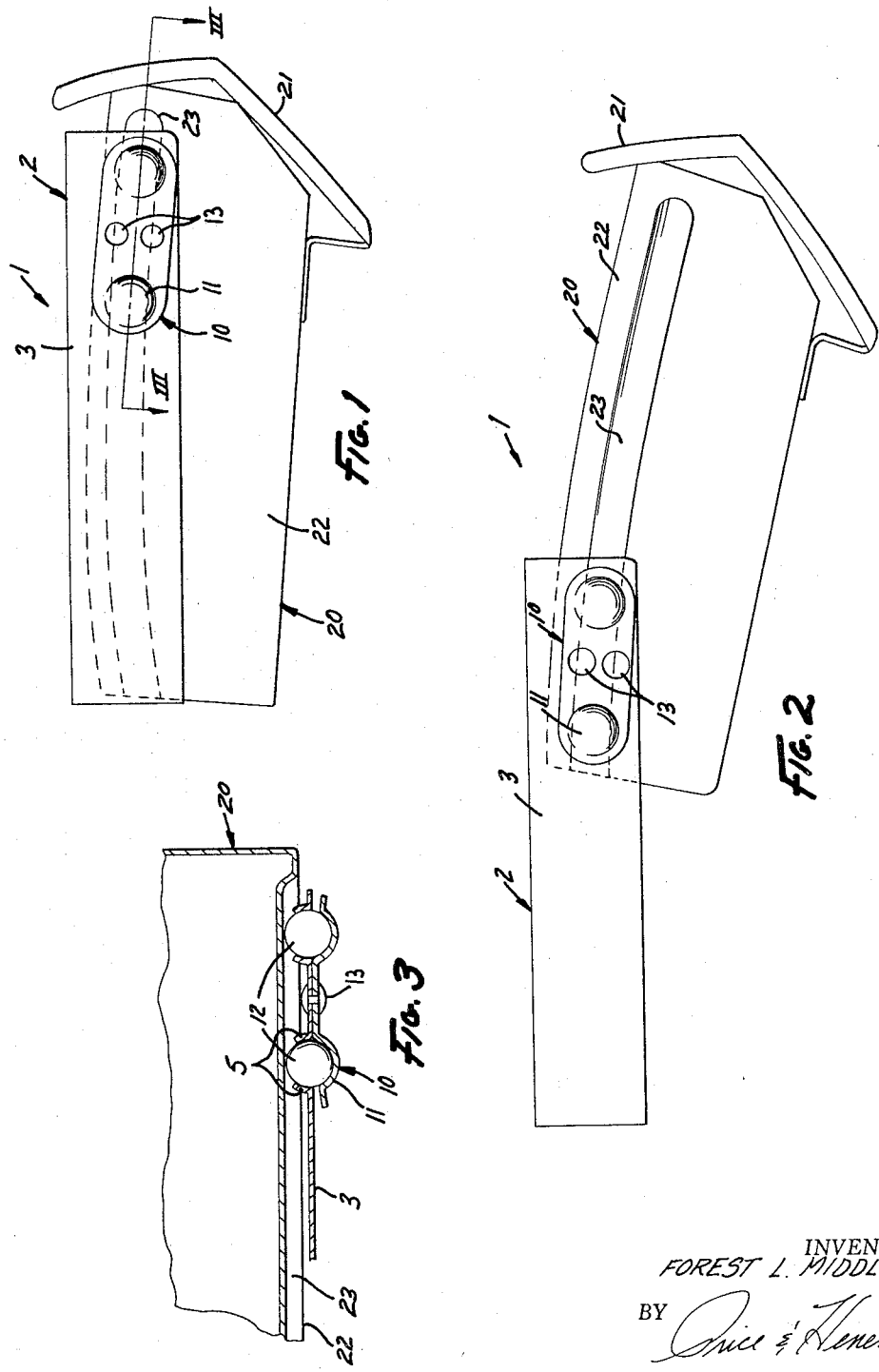

Filed June 1, 1965    3 Sheets-Sheet 2

INVENTOR.
FOREST L. MIDDLETON

BY
*Price & Heneveld*

ATTORNEYS

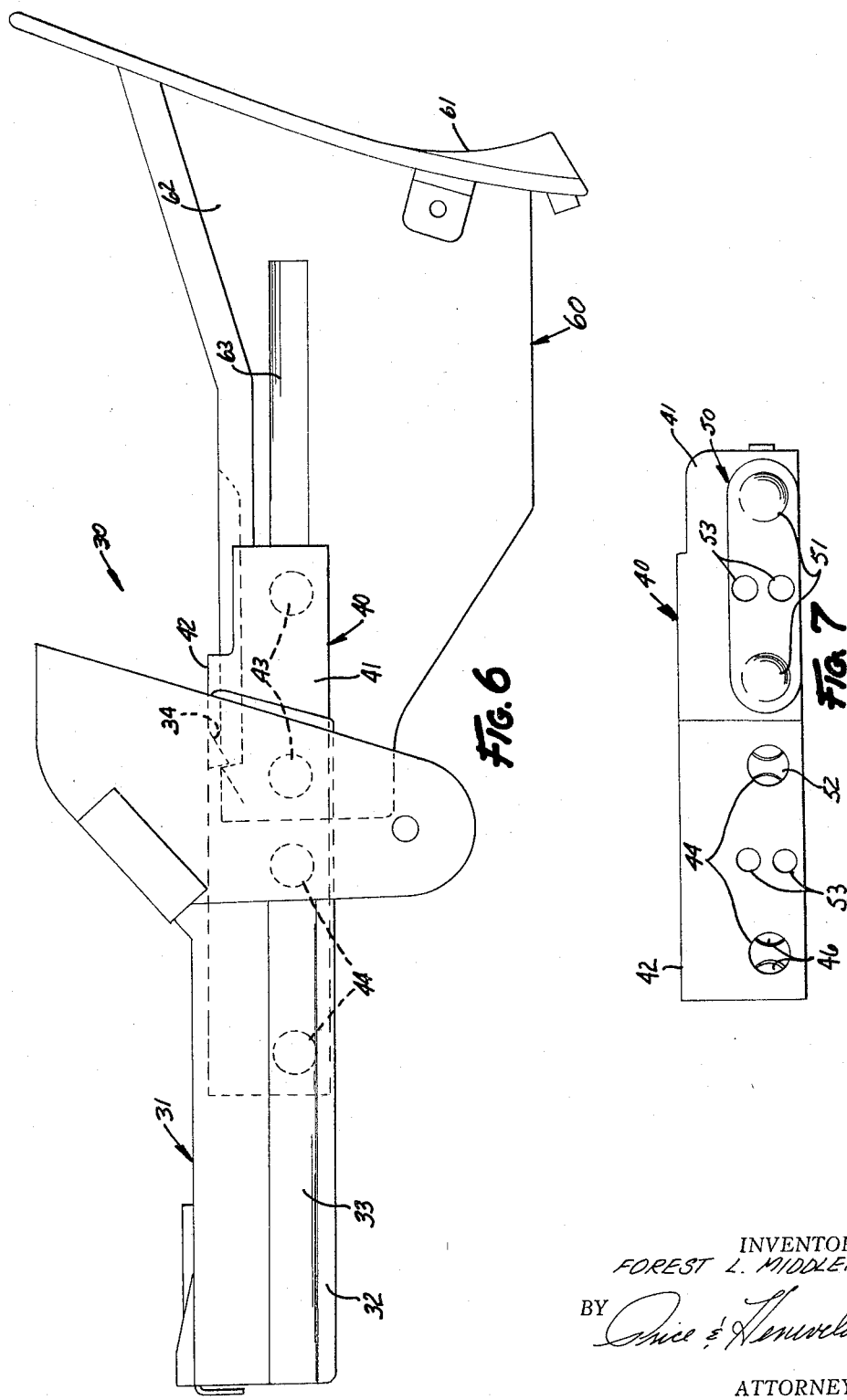

United States Patent Office 3,295,903
Patented Jan. 3, 1967

3,295,903
ASH TRAY
Forest L. Middleton, Middleville, Mich., assignor to Lescoa, Inc., Grand Rapids, Mich., a corporation of Michigan
Filed June 1, 1965, Ser. No. 460,395
14 Claims. (Cl. 312—246)

This invention relates to ash trays. More particularly, this invention relates to an ash tray adapted to be mounted in the interior of an automobile and the like, having a unique means for moving the ash box with respect to its mounting.

Many types of ash trays for automobiles are presently in existence. One problem which is inherent in the structure of all such ash trays is the lack of a completely smooth operation, for example, in pulling the tray outwardly from the dash for use or pushing it back flush with the dash to close it. Moving parts rub against one another causing friction and sticking of the ash tray. Patent No. 3,109,688, issued November 5, 1963 disclosed an improved type of ash tray which solved this particular problem. The ash tray disclosed in this patent uniquely utilized a carriage element and roller bearing means in its operation, essentially eliminating friction and cocking of the component parts and essentially eliminating sticking of the tray.

The present invention is an extension of the structure disclosed in Patent No. 3,109,688 in that a unique means is provided for support of the roller bearings with respect to the component parts of the ash tray. This means includes a ball bearing retainer having spring characteristics which holds the ball bearings against the ash box under tension. The structure is extremely simple, yet provides the advantages of utilizing roller bearing connections. In another aspect of the invention, this unique ball bearing retaining means enables the ash box to be pulled out a greater distance from the member in which it is mounted, e.g. the dash of an automobile.

It is therefore an object of this invention to provide an improved type of ash tray for automobiles and the like which utilizes a roller bearing connection for sliding movement, this utilization being accomplished through a simplified construction. Ash trays for automobiles and the like are extremely competitive items and any simplification of design which makes the ash tray less expensive to fabricate is important to the art.

A further object of this invention is the provision of such an ash tray which utilizes retainers for ball bearings having spring characteristics to retain ball bearings in tracks under tension.

An additional object of this invention is the provision of such an ash tray which utilizes the retainer for ball bearings having spring characteristics in combination with a carriage element which enables one to retract the ash box from the dash a maximum distance.

These and other objects of this invention will become apparent to those skilled in the relevant arts upon reading the following specification in conjunction with the accompanying drawing, wherein:

FIG. 1 is a side view of an ash tray utilizing the teachings of this invention;

FIG. 2 is a side view similar to FIG. 1, the ash box being withdrawn and positioned for use;

FIG. 3 is a cross-sectional view taken along the plane III—III of FIG. 1;

FIG. 7 is a side view of the carriage element utilized in the ash tray shown in FIG. 5; and FIG. 8 is a top view showing the interconnection of the mounting member, the carriage element and the ash box thereof, certain parts thereof broken away to better show the invention.

Briefly, this invention relates to an ash tray adapted to be mounted in the interior of an automobile and the like, having a member including a pair of depending flanges. The flanges define openings therethrough. A ball retainer is secured to each of said flanges, ball bearings positioned in the retainers, the ball bearings extending through the openings. The retainers are fabricated of a material exhibiting spring characteristics. An ash box including a pair of tracks at its sides is positioned between the flanges. The ball bearings engage the tracks under tension through the retainers whereby the box is movable with respect to the member as the ball bearings rotate in the tracks and the retainers.

Figure 4:
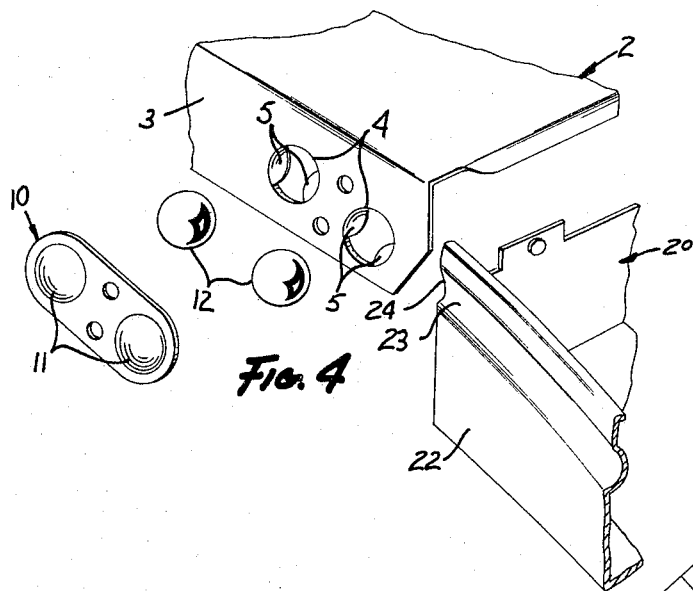
FIG. 4 is an exploded view showing the component parts of the ash tray of FIG. 1 in perspective.

Referring more specifically to the drawing, the reference numeral 1 designates an ash tray incorporating the teachings of this invention (FIG. 1). The ash tray 1 includes a mounting member 2, ball bearing retainers 10 and an ash box 20. The mounting member 2 includes a pair of depending flanges 3 along each of its side edges. It should be understood that the mounting member could comprise a part of the dash of the automobile. Adjacent the forward edge of each of the flanges 3 a pair of openings 4 are struck. Tabs 5 extend inwardly from the flanges 3 at the edges of the openings 4 (FIGS. 3 and 4).

A ball bearing retainer 10 is secured to the outer surface of each flange 3 of the mounting member 2. The retainers 10 are fabricated of a material exhibiting spring characteristics. Each retainer 10 includes a ball bearing receptacle 11 adjacent each of its ends. Ball bearings 12 are of a size to be rotatably received in the receptacles 11. For especially smooth operation, the inner surfaces of the receptacles 11 may be coated with a lubricant such as Teflon. With the ball bearings 12 in the receptacles 11, each retainer 10 is positioned against the outer surface of a flange 3, positioned such that the ball bearings 12 extend into the openings 4, the tabs 5 preventing the ball bearings from passing therethrough. The retainers 10 are then secured to the flanges 3 by suitable means, such as the rivets 13. It will be noted that in the embodiment shown, a pair of rivets 13 are positioned one above the other to secure generally the center of the retainers to the flanges. This enables the retainers 10 to effectively utilize their spring characteristics in retaining the ball bearings in proper position, as will be more fully explained hereinafter.

The ash box 20 is of a size to be slidably received between the flanges 3 of the mounting member 2. The ash box 20 includes a front panel 21 which preferably is adapted to lie flush with the dash of an automobile and a pair of sides 22. Extending along generally the length of each side 22 is a track 23, in the embodiment shown comprising a bead formed in the sides of the ash box. At the termination of each track at the back of the ash box, the bead is slightly deformed at 24 to form a limited stop means as will be more fully explained hereinafter.

From an examination of FIGS. 1–4, it will be seen that the portions of the ball bearings 12 extending through the openings 4 of the flanges 3 extend into the tracks 23 in the sides of the ash box 20. The ash box 20 is of a size such that the ball bearings 12 are biased outwardly. This transmits force to the ends of the retainers 10 through the ball bearings. Thus, a sure and positive engagement is provided between the ash box and the mounting member through the retainers 10. As one moves the ash box 20 with respect to the mounting member 2, the ball bearings 12 rotate within the receptacles 11 and the tracks 23. Due to the spring characteristics of the retainers 10, pressure is applied to the ball bearings within the tracks 23. When the ash box 20 is fully extended as shown in FIG. 2, the rear ball bearings engage the deformation 24 which acts as a limited stop means. However, because of the spring characteristics of the retainers, a sharp pull outwardly of the ash box 20 snaps the ball bearings 12 past the deformations 24. Likewise, to reinsert the ash box 20, one forces it past the ball bearings 12 which is possible because of the spring characteristics of the retainers. It will be seen that this structure is extremely simple yet functions to achieve all of the advantages of a roller bearing connection between the ash box and its mounting. Removal and reinsertion of the ash box is extremely simple due to the spring characteristics of the retainers. Additionally, these spring characteristics enable this simplified construction to exhibit exceptional qualities of smoothness and accuracy in operation.

Figure 5:
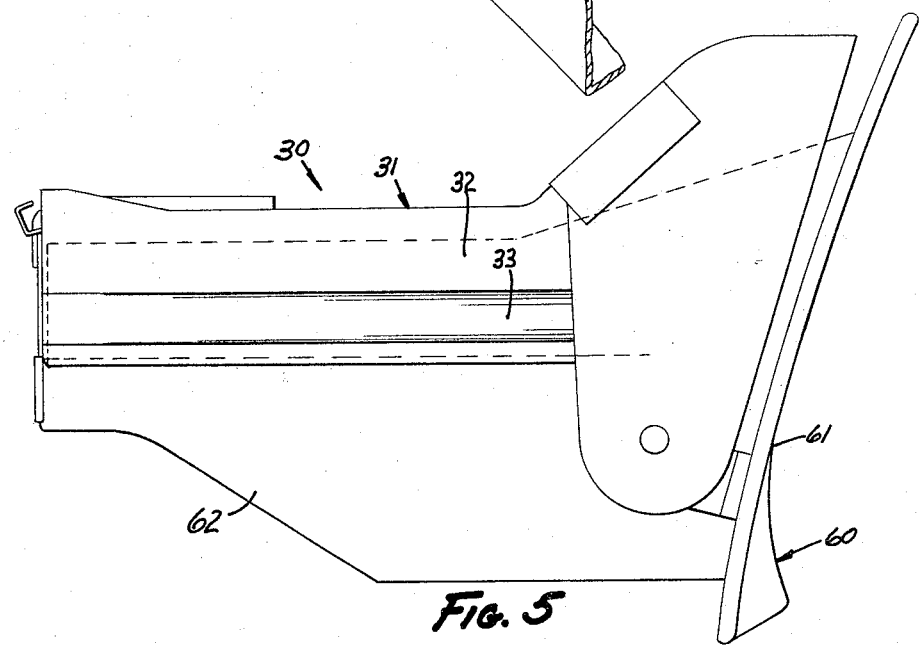
FIG. 5 is a side view of a modified form of ash tray utilizing the teachings of this invention.
Figure 6:
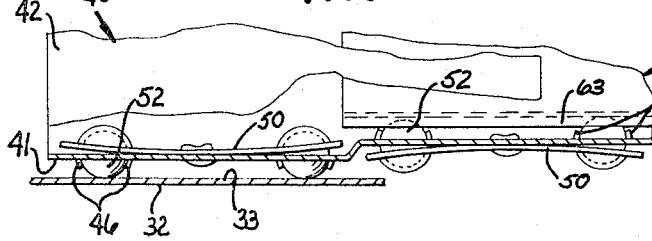
FIG. 6 is a side view of the ash tray shown in FIG. 5, the ash box being extended for use.

Turning to FIG. 5, a modified ash tray 30 is shown which utilizes the teachings noted hereinbefore. The ash tray 30 includes a mounting member 31, a carriage element 40, a plurality of ball bearing retainers 50 and an ash box 60 (FIGS. 6 and 7). The mounting member 31 is preferably a part of the dash of an automobile or the like, including a pair of depending flanges 32 each having a track 33 extending along its length, in the embodiment shown the tracks comprising beads formed in the flanges. A stop 34 is associated with the mounting member 31 (FIG. 6), the purpose of which will be explained hereinafter.

The carriage element 40 (FIGS. 6, 7 and 8) is of generally inverted U-shape including a pair of depending flanges 41 and a connecting top web 42. Pairs of openings 43 and 44 are formed in each of the flanges 41 of the carriage element 40. Tabs 45 and 46 extend respectively from the edges of the openings 43 and 44, the tabs extending in opposite directions from each flange 41, the purpose of which will be explained hereinafter.

A plurality of ball bearing retainers 50, similar to the retainers 10 described hereinbefore, are secured to the carriage element 40. Each ball bearing retainer 50 includes a ball bearing receptacle 51 adjacent each of its ends, preferably coated with Teflon. Ball bearings 52 are positioned within each of the receptacles 51, and the retainers are secured to the flanges 41 of the carriage element 40 by means of a pair of spaced rivets 53, one above the other, securing the centers of the retainers to the flanges. As described hereinbefore, the retainers are formed from a material exhibiting spring characteristics. It will be noted from FIG. 8 that a ball bearing retainer 50 is secured to each side surface of a flange 41. Thus, ball bearings extend through openings 43 and 44 to be exposed on each side of the flanges 41, the ball bearings held in position by the tabs 45 and 46. The flanges 41 of the carriage element are bent at 47 to properly position the ball bearing retainers 50, the purpose of which will be described hereinafter.

The ash box 60 includes a front panel 61 and a pair of sides 62 each including a track 63 extending generally along its length. The ash box 60 is generally similar to the ash box 20 described hereinbefore. In assembly, the ash box 60 is of a size fitting between the flanges 41 of the carriage element 40. The carriage element 40 is of a size fitting between the flanges 32 of the mounting member 31. When thus assembled, it will be seen that the ball bearings associated with the openings 43 extend into the tracks 63 of the ash box 60. The ball bearings associated with the openings 44 extend into the tracks 33 associated with the mounting member 31. Each individual ball bearing retainer 50 operates in the manner as described in detail with respect to ball bearing retainers 10 hereinbefore. Thus, the respective retainers 50 apply spring tension to the respective ball bearings lying in the tracks 33 and 63. This assures an accurate connection between the mounting member, the carriage element and the ash box. This construction has one additional characteristic. As noted from FIG. 6, the ash box 60 may be withdrawn almost entirely from the mounting member 31 for use. This is possible because the carriage element provides maximum sliding movement through one set of retainers with respect to the mounting member 31 and also maximum movement of the ash box 60 with respect to the carriage element through the other set of retainers. Consequently, the ash box may be withdrawn to a position actually lying almost exteriorly of the mounting member 31, the limit of movement dictated by abutment of the carriage element 40 with the stop 34 of the mounting member 31. Thus, all of the advantages gained with respect to the retainers 50 as described hereinbefore are gained with this construction in addition to the fact that the ash box may be withdrawn to a greater degree then previously possible. This is especially important in situations where the automobile utilizes a dash which slopes inwardly. When this is the case, if an ash box cannot be withdrawn its entire length, the ash box is extremely inconvenient and at times dangerous to use.

While only certain embodiments of this invention have been shown and described, it may be possible to practice the invention through the utilization of certain other embodiments without departing from the spirit and scope thereof. Such other embodiments are to be included as part of this invention unless the following claims specifically state otherwise.

I claim:
1. An ash tray adapted to be mounted in the interior of an automobile and the like, comprising: a member including a pair of flanges; said flanges defining openings therethrough; a ball retainer secured to each of said flanges; ball bearings positioned in said retainers, said ball bearings extending through said openings; said retainers fabricated of a material exhibiting spring characteristics; an ash box including a pair of tracks at its sides; and said ball bearings engaging said tracks under tension through said retainers whereby said box is movable with respect to said member as said ball bearings rotate in said tracks and said retainers.

2. An ash tray adapted to be mounted in the interior of an automobile and the like, comprising: a member including a pair of flanges; said flanges defining openings therethrough; a ball retainer secured to each of said flanges; ball bearings positioned in said retainers, said ball bearings extending through said openings; tabs associated with said openings on the side of said flanges opposite from said retainers for preventing ball bearings from passing therethrough; said retainers fabricated of a material exhibiting spring characteristics; an ash box including a pair of tracks at its sides; and said ball bearings engaging said tracks under tension through said retainers whereby said box is movable with respect to said member as said ball bearings rotate in said tracks and said retainers.

3. An ash tray adapted to be mounted in the interior of an automobile and the like, comprising: a member including a pair of flanges; said flanges defining openings therethrough; a ball retainer secured to each of said flanges; each of said retainers including ball bearing receptacles at each of its ends and secured at generally its center to its respective flange; ball bearings positioned in said receptacles, said ball bearings extending through said openings; and retainers fabricated of a material exhibiting spring characteristics; an ash box including a pair of tracks at its sides; and said ball bearing engaging said tracks under tension through said retainers whereby said box is movable with respect to said member as said ball bearings rotate in said tracks and said retainers.

4. An ash tray adapted to be mounted in the interior of an automobile and the like, comprising: a member including a pair of flanges; said flanges defining openings therethrough; a ball retainer secured to each of said flanges; each of said retainers including ball bearing receptacles at each of its ends and secured at generally its center at a pair of points one above the other to its respective flange; ball bearings positioning in said receptacles, said ball bearings extending through said openings; said retainers fabricated of a material exhibiting spring characteristics; an ash box including a pair of tracks at its sides; and said ball bearings engaging said tracks under tension through said retainers whereby said box is movable with respect to said member as said ball bearings rotate in said tracks and said retainers.

5. An ash tray adapted to be mounted in the interior of an automobile and the like, comprising: a member including a pair of flanges; said flanges defining openings therethrough; a ball reainer secured to the outer surface of each of said flanges; each of said retainers including ball bearing receptacles at each of its ends and secured at generally its center to its respective flange; ball bearings positioned in said receptacles, said ball bearings extending through said openings; said retainers fabricated of a material exhibiting spring characteristics; an ash box lying between said flanges and including a bead along each of its sides; the terminus of said beads at the rear of said box bent to form limited stop means; and said ball bearings engaging said tracks under tension through said retainers whereby said box is movable with respect to said member as said ball bearings rotate in said tracks and said retainers.

6. An ash tray adapted to be mounted in the interior of an automobile and the like, comprising: a member including a pair of flanges; said flanges defining openings therethrough; a ball retainer secured to the surface of each of said flanges; each of said retainers including ball bearing receptacles at each of its ends and secured at generally its center at a pair of points one above the other to its respective flange; ball bearings positioned in said receptacles, said ball bearings extending through said openings; said retainers fabricated of a material exhibiting spring characteristics; an ash box lying between said flanges and including a bead along each of its sides; the terminus of said beads at the rear of said box bent to form limited stop means; and said ball bearings engaging said tracks under tension through said retainers whereby said box is movable with respect to said member as said ball bearings rotate in said tracks and said retainers.

7. An ash tray adapted to be mounted in the interior of an automobile and the like, comprising: a member including a pair of flanges; said flanges defining openings therethrough; a ball retainer secured to the outer surface of each of said flanges; each of said retainers including ball bearing receptacles at each of its ends and secured at generally its center to its respective flange; ball bearings positioned in said receptacles, said ball bearings extending through said openings; tabs associated with said openings on the side of said flanges opposite from said retainers for preventing ball bearings from passing therethrough; said retainers fabricated of a material exhibiting spring characteristics; an ash box lying between said flanges and including a bead along each of its sides; the terminus of said beads at the rear of said box bent to form limited stop means; and said ball bearings engaging said tracks under tension through said retainers whereby said box is movable with respect to said member as said ball bearings rotate in said tracks and said retainers.

8. An ash tray adapted to be mounted in the interior of an automobile and the like, comprising: a mounting member including a pair of tracks at its sides; an ash box including a pair of tracks at its sides; a carriage element having a pair of depending flanges; said flanges defining openings therethrough; a ball retainer secured to each side of each of said flanges; ball bearings positioned in said retainers, said ball bearings extending through said openings from said retainers to each side of said flanges; said retainers fabricated of a material exhibiting spring characteristics; and respective of said ball bearings engaging said tracks of said member and said box under tension through said retainers whereby said box is movable with respect to said member as said ball bearings rotate in said tracks and said retainers.

9. An ash tray adapted to be mounted in the interior of an automobile and the like, comprising: a mounting member including a pair of tracks at its sides; an ash box including a pair of tracks at its sides; a carriage element having a pair of depending flanges; said flanges defining openings therethrough; a ball retainer secured to each side of each of said flanges; ball bearings positioned in said retainers, said ball bearings extending through said openings from said retainers to each side of said flanges; tabs associated with said openings on the side of said flanges opposite from said retainers for preventing ball bearings from passing therethrough; said retainers fabricated of a material exhibiting spring characteristics; and respective of said ball bearings engaging said tracks of said member and said box under tension through said retainers whereby said box is movable with respect to said member as said ball bearings rotate in said tracks and said retainers.

10. An ash tray adapted to be mounted in the interior of an automobile and the like, comprising: a mounting member including a pair of tracks at its sides; an ash box including a pair of tracks at its sides; a carriage element having a pair of depending flanges; said flanges defining openings therethrough; a ball retainer secured to each side of each of said flanges; each of said retainers including ball bearing receptacles at each of its ends and secured at generally its center to its respective flange; ball bearings positioned in said retainers, said ball bearings extending through said openings from said retainers to each side of said flanges; said retainers fabricated of a material exhibiting spring characteristics; and respective of said ball bearings engaging said tracks of said member and said box under tension through said retainers whereby said box is movable with respect to said member as said ball bearings rotate in said tracks and said retainers.

11. An ash tray adapted to be mounted in the interior of an automobile and the like, comprising: a mounting member including a pair of tracks at its sides; an ash box including a pair of tracks at its sides; a carriage element having a pair of depending flanges; said flanges defining openings therethrough; a ball retainer secured to each side of each of said flanges; each of said retainers including ball bearing receptacles at each of its ends and secured at generally its center at a pair of points one above the other to its respective flange; ball bearings positioned in said retainers, said ball bearings extending through said openings from said retainers to each side of said flanges; said retainers fabricated of a material exhibiting spring characteristics; and respective of said ball bearings engaging said tracks of said member and said box under tension through said retainers whereby said box is movable with respect to said member as said ball bearings rotate in said tracks and said retainers.

12. An ash tray adapted to be mounted in the interior of an automobile and the like, comprising: a mounting member including a pair of tracks at its sides; an ash box including a pair of tracks at its sides; a generally inverted U-shaped carriage element having a pair of depending flanges, said element positioned within said member, said ash box positioned between said flanges; said flanges defining openings therethrough; a ball retainer secured to each side of each of said flanges; each of said retainers including ball bearing receptacles at each of its ends and secured at generally its center to its respective flange; ball bearings positioned in said retainers, said ball bearings extending through said openings from said retainers to each side of said flanges; tabs associated with said openings on the side of said flanges opposite from said retainers from preventing ball bearings from passing therethrough; said retainers fabricated of a material exhibiting spring characteristics; and respective of said ball bearings engaging said tracks of said member and said box under tension through said retainers whereby said box is movable with respect to said member as said ball bearings rotate in said tracks and said retainers.

13. An ash tray adapted to be mounted in the interior of an automobile and the like, comprising: a mounting member including a pair of tracks at its sides; an ash box including a pair of tracks at its sides; a generally inverted U-shaped carriage element having a pair of depending flanges, said element positioned within said member, said ash box positioned between said flanges; said flanges defining openings therethrough; a ball retainer secured to each side of each of said flanges; each of said retainers including ball bearing receptacles at each of its ends and secured at generally its center to its respective flange; ball bearings positioned in said retainers, said ball bearings extending through said openings from said retainers to each side of said flanges; tabs associated with said openings on the side of said flanges opposite from said retainers for preventing ball bearings from passing therethrough; said retainers fabricated of a material exhibiting spring characteristics; respective of said ball bearings engaging said tracks of said member and said box under tension through said retainers whereby said box is movable with respect to said member as said ball bearings rotate in said tracks and said retainers; and stop means limiting outward movement of said element and said ash box with respect to said member.

14. An ash tray adapted to be mounted in the interior of an automobile and the like, comprising: a mounting member including a pair of tracks at its sides; an ash box including a pair of tracks at its sides; a generally inverted U-shaped carriage element having a pair of depending flanges, said element positioned within said member, said ash box positioned between said flanges; said flanges defining openings therethrough; a ball retainer secured to each side of each of said flanges; each of said retainers including ball bearing receptacles at each of its ends and secured at generally its center at a pair of points one above the other to its respective flange; ball bearings positioned in said retainers, said ball bearings extending through said openings from said retainers to each side of said flanges; tabs associated with said openings on the side of said flanges opposite from said retainers for preventing ball bearings from passing therethrough; said retainers fabricated of a material exhibiting spring characteristics; respective of said ball bearings engaging said tracks of said member and said box under tension through said retainers whereby said box is movable with respect to said member as said ball bearings rotate in said tracks and said retainers; and stop means limiting outward movement of said element and said ash box with respect to said member.

References Cited by the Examiner
UNITED STATES PATENTS

| 2,809,877 | 10/1957 | Hammesfahr | 312—246 |
| 2,944,865 | 7/1960 | Hammesfahr | 312—246 X |
| 3,109,688 | 11/1963 | Middleton | 312—246 |

FOREIGN PATENTS 1,282,417  12/1961  France.

References Cited by the Applicant
UNITED STATES PATENTS 2,334,925  11/1943  Hendricks.
3,017,227  1/1962  Thornton.

CLAUDE A. LeROY, *Primary Examiner.*

F. DOMOTOR, *Assistant Examiner.*